US007179214B2

(12) United States Patent
Kitahara

(10) Patent No.: US 7,179,214 B2
(45) Date of Patent: Feb. 20, 2007

(54) SPLITTING BLADE CHANGING DEVICE FOR BLOCK SPLITTER

(75) Inventor: Tetsugoro Kitahara, Okayama (JP)

(73) Assignee: Tiger Machine Co., Ltd., Takahashi (JP)

(*) Notice: Subject to any disclaimer, the term of this patent is extended or adjusted under 35 U.S.C. 154(b) by 147 days.

(21) Appl. No.: 11/107,289

(22) Filed: Apr. 15, 2005

(65) Prior Publication Data

US 2006/0128542 A1 Jun. 15, 2006

(30) Foreign Application Priority Data

Dec. 13, 2004 (JP) ............................. 2004-359610

(51) Int. Cl.
*B23Q 3/155* (2006.01)

(52) U.S. Cl. ............................ 483/16; 483/30; 483/31; 483/36; 29/36

(58) Field of Classification Search .................. 483/16, 483/30, 31, 36; 29/36; 83/870, 874, 955; 225/103, 104, 105
See application file for complete search history.

(56) References Cited

U.S. PATENT DOCUMENTS

| | | | | |
|---|---|---|---|---|
| 4,443,928 A * | 4/1984 | Kielma | 483/46 |
| 4,795,334 A * | 1/1989 | Kitahara | 425/88 |
| 5,002,711 A * | 3/1991 | Iwama et al. | 264/71 |
| 5,230,685 A * | 7/1993 | Christen et al. | 483/55 |
| 5,478,271 A * | 12/1995 | Thibaut | 451/342 |
| 6,030,326 A * | 2/2000 | Azuma et al. | 483/31 |
| 6,162,041 A * | 12/2000 | Kobayashi | 425/421 |
| 6,499,985 B1 * | 12/2002 | Sekiguchi et al. | 425/186 |
| 6,530,769 B1 * | 3/2003 | Rondeau et al. | 425/186 |
| 6,730,007 B2 * | 5/2004 | Pallmann | 483/31 |
| 7,055,517 B1 * | 6/2006 | Kitahara | 125/23.01 |

FOREIGN PATENT DOCUMENTS

JP 2000-141360 5/2000

* cited by examiner

*Primary Examiner*—Dana Ross
(74) *Attorney, Agent, or Firm*—Flynn, Thiel, Boutell & Tanis, P.C.

(57) ABSTRACT

A splitting blade changing device for a block splitter, comprising a revolving mechanism in which an upper rotary member is suspended by a supporting plate which is moved up and down by a cylinder installed in an upper part of a gate-like frame, a plurality of upper blades are held on a circumferential face of the upper rotary member, a slit is provided in a table which is supported in a lower portion of the gate-like frame via buffer members, an lower rotary member fixed detachably on a bottom plate of the gate-like frame is installed in a lower part of the table, a plurality of lower blades facing the upper blades are held on a circumferential surface of the lower rotary member such that one of the lower blades protrudes from the table surface via the slit of the table, and the upper and lower rotary members sequentially select and install the upper blades and lower blades. The device enables the attainment of split blocks having a desired surface shape without requiring a cumbersome process of replacing splitting blades.

6 Claims, 6 Drawing Sheets

SPLITTING BLADE CHANGING DEVICE FOR BLOCK SPLITTER

BACKGROUND OF THE INVENTION

1. Field of the Invention

The present invention relates to a splitting blade changing device used in a machine for splitting molded blocks (hereinafter, referred to as a block splitter).

2. Description of the Prior Art

FIG. 6 is a front view showing a main part of a block splitter which has long been used, where a holder plate 82 is horizontally fixed to a lower end of one set of hydraulic cylinder 81 which is attached to the upper part of a gate-like frame 80, and when activating the hydraulic cylinder 81, the holder plate 82 can be moved up and down along with a slide shaft 84.

One upper blade 86 is fixed to a lower end of the holder plate 82 by means of bolts 87. Further, a table 90 on which a molded block 88 is to be placed is horizontally fixed to the lower part of the gate-like frame 80, and one lower blade 92 extending horizontally facing the upper blade 86 is provided inside a slit 91 of the table 90.

The table 90 is mounted on buffer members 94 such as an air bag. The blade edge of the upper blade 86 which is descended by operating the hydraulic cylinder 81 is pressed against an upper surface of the block 88. When the upper blade 86 is further descended, the table 90 is elastically descended with a deflection of the buffer member 94, and a blade edge of the lower blade 92 installed inside the slit 91 protrudes from a face of the table 90 and is pressed against a bottom face of the block 88. Then the block 88 is split by the upper blade 86 and the lower blade 92 (see Japanese Patent Publication No. 2000-141360A).

In such a block splitter, the upper blade 86 and the lower blade 92 need to be replaced appropriately in accordance with the shape, size and the like of the molded block, or with a desired surface shape of the resultant split blocks. In this case, since the upper blade 86 and the lower blade 92 are fixed respectively to the holder plate 82 and a seat plate 83 by means of the bolts 87 or the like, the upper blade 86 and the lower blade 92 are replaced with other upper blade and lower blade after removing the bolts and the like. It takes a substantial time even for a skilled engineer in such replacement of the splitting blades. Also nowadays, automation of a process from molding to finishing blocks by using an industrial robot has been progressing. Although the splitter needs to be stopped in order to change the splitting blades, the problem is that stopping the splitting process becomes a factor of lowering the production efficiency of the entire equipment.

SUMMARY OF THE INVENTION

The present invention is contrived to eliminate the problem described above, and an object of the present invention is to provide an apparatus which can obtain split blocks having a desired surface shape by holding a plurality of splitting blades on a circumferential face of a rotary member without going through a cumbersome process of replacing the splitting blades.

The present invention has employed the following configuration in order to solve the above-described problem.

(1) A splitting blade changing device for a block splitter, comprising a revolving mechanism in which an upper rotary member is suspended by a supporting plate which is moved up and down by a cylinder installed in an upper part of a gate-like frame, a plurality of upper blades are held on a circumferential face of the upper rotary member, a slit is provided in a table which is supported in a lower portion of the gate-like frame via buffer members, an lower rotary member fixed detachably on a bottom plate of the gate-like frame is installed in a lower part of the table, a plurality of lower blades facing the upper blades are held on a circumferential surface of the lower rotary member such that one of the lower blades protrudes from the table surface via the slit of the table, and the upper and lower rotary members sequentially select and install the upper blades and lower blades.

For the cylinder which moves the supporting plate up and down, the various types can be used. Examples include hydraulic, vapor pressure type, combustion pressure type cylinders and the like. As a method of pivotally holding the rotary member to the supporting plate, the face of the detachable rotary member to which no splitting blades are attached may be fitted to the supporting plate by means of a fitting such as a bolt or the like, or both axial ends of the rotary member may be fixed to the supporting plates. Further, the various types of buffer members are used. For example, an air bag, coiled spring where a spring steel is used, plate spring, disk spring and the like are used.

(2) A splitting blade changing device for a block splitter, comprising a revolving mechanism in which a pair of upper rotary members are suspended by a pair of supporting plates which are moved up and down by a pair of cylinders installed in an upper part of a gate-like frame, a plurality of upper blades are held on each of circumferential surfaces of the upper rotary members so as to make a plurality of pairs of upper blades with the upper blades held on circumferential surfaces of the other upper rotary member, a slit is provided in a table which is supported in a lower portion of the gate-like frame via buffer members, a lower rotary member fixed detachably on a bottom plate of the gate-like frame is installed in a lower part of the table, a plurality of lower blades facing the upper blades are held on a circumferential surface of the lower rotary member so as to protrude from the table surface via the slit of the table, and the upper and lower rotary members sequentially select and install the upper blades and lower blades.

By using paired two upper blades, two molded blocks having a length that is half the normal length can be split at once into a total of four blocks in two rows. Moreover, molded blocks with irregular sizes can be split in order not to generate damaged products. Also the lower blades are not necessarily paired, but they may be used in pairs, like the upper blades, by causing the lower blades to face the upper blades.

(3) The splitting blade changing device for a block splitter according to (1) or (2) above, wherein a concave portion is provided at both axial ends or one axial end of the upper rotary member(s), and two or one handling devices, which have a convex portion having a shape to be fitted and fixed into the concave portion and have a grasping portion on the other ends, are installed in the axial direction of the upper rotary member(s) as through shafts passing the gate-like frame.

By fitting the handling device(s) in one or both ends of the upper rotary member, and rotating the rotary member by moving the handle manually or mechanically, any splitting blade can be selected easily. Various methods can be employed as a method of fitting the handling device(s) in one end or both ends of the rotary member. Examples include a method of fitting by forming an end or ends of the rotary member into a hexagonal convex as a hexagonal wrench, and forming an end or ends of the handling device (s) facing the end or ends of the rotary member into a hexagonal concave so as to be fitted into the convex, and other methods.

(4) The splitting blade changing device for a block splitter according to any of (1) to (3) above, wherein the upper rotary member and the lower rotary member are formed in a shape of a polygonal column having side faces (excluding both end faces in the axial direction of the rotary members) twice as many as the number of a plurality of upper blades or lower blades that are held on the circumferential surface of each rotary member.

By smoothing each face of the rotary members supporting the splitting blades, it is possible to hold the splitting blades on the face of each rotary member more securely than on a curved face.

The present invention has an effect of providing a block splitter which comprises a supporting plate which is moved up and down by a cylinder, a detachable upper rotary member, and a lower rotary member of the same sort under a table, and which can obtain split blocks having a desired surface configuration by holding a plurality of splitting blades on a circumferential surface of the rotary member without going through a cumbersome process of replacing the splitting blades.

DETAILED DESCRIPTION OF THE PREFERRED EMBODIMENTS

Hereinbelow, an embodiment of the present invention is described based on the drawings.

Figure 1:
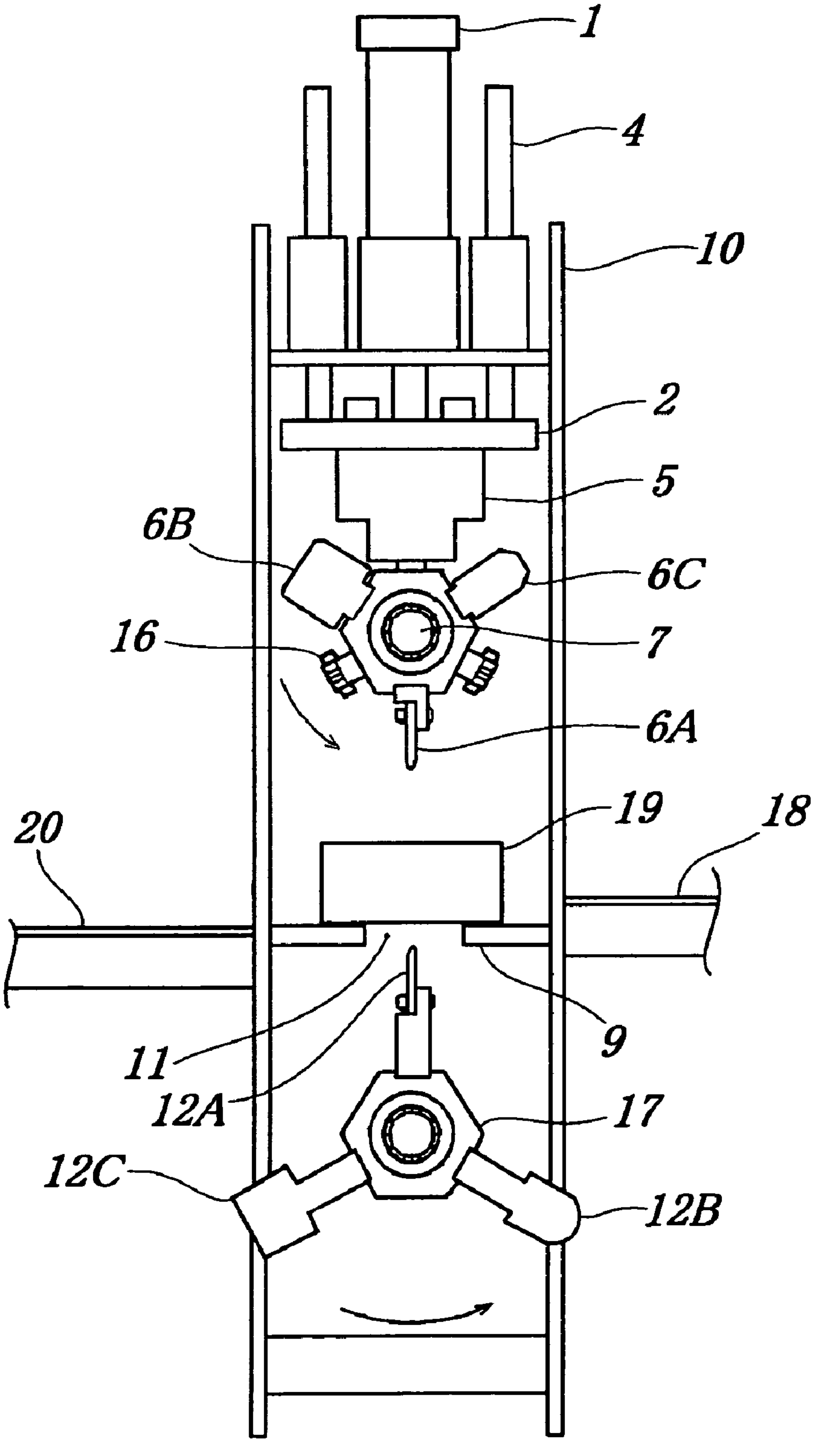
FIG. 1 is a side view showing an example of an embodiment of the present invention.

FIG. 1 is a side view showing an example of the embodiment of the present invention, in which a supporting plate 5 is fixed to a fixing plate 2 which is moved up and down by a hydraulic cylinder 1 installed in the upper part of a gate-like frame 10. Reference numeral 4 indicates slide shafts. Further, a fitting convex portion 16, which is formed on a circumferential surface of an upper rotary member 7, is fitted in a bottom part of the supporting plate 5, thereby suspending the rotary member 7. Three upper blades 6A, 6B and 6C are supported on the circumferential surface of the rotary member 7. Furthermore, in the lower part of the gate-like frame 10, there is a table 9 mounted on buffer members (not shown), and the table 9 is provided with a slit 11 for protruding a lower blade. A lower rotary member 17 is installed in the lower part of the table 9. A circumferential surface of this rotary member 17 is provided with a plurality of lower blades 12A, 12B and 12C that face the upper blades 6A, 6B and 6C. Further, the lower blade 12A needs to be held on the circumferential surface of the rotary member 17 so as to protrude from the face of the table 9 through the slit 11. Moreover, the supporting plate 5 and the rotary member 7 have a structure so as to be detachably attached. Each of the rotary members is in the shape of a hexagonal column. The circumferential surface of the rotary member 7 is provided with faces to which the upper blades are attached, and faces on which the fitting convex portions 16 are formed. The fitting convex portion 16 is fixed to a fitting hole formed at the bottom part of the supporting plate 5. Fastening of the rotary member to the supporting plate may be effected by means of a magnetic lock or bolts.

A molded block 19 to be split is conveyed onto the table 9 of the block splitter by a conveyer 18. The conveyed molded block 19 is positioned at rest in a central part of the table 9. The slit 11 portion of the table 9 is present under the bottom face of the molded block 19 which is positioned at rest. The table 9 is mounted on the buffer members (not shown), and the blade edge of the upper blade 6A which is descended by the hydraulic cylinder 1 is pressed against the upper surface of the block 19. When the upper blade 6A is further descended from this state, the buffer members are elastically pressed down, then the table 9 is elastically descended, and the lower blade 12A which is installed inside the slit 11 protrudes from the face of the table 9 and pressed against the bottom face of the block 19. Then the block 19 is sandwiched between the upper blade 6A and the lower blade 12A and split. After the block 19 has been split, the upper blade 6A is moved upward again by the hydraulic cylinder 1. The split molded block 19 is transferred to the next process by a discharge conveyer 20.

Figure 2:
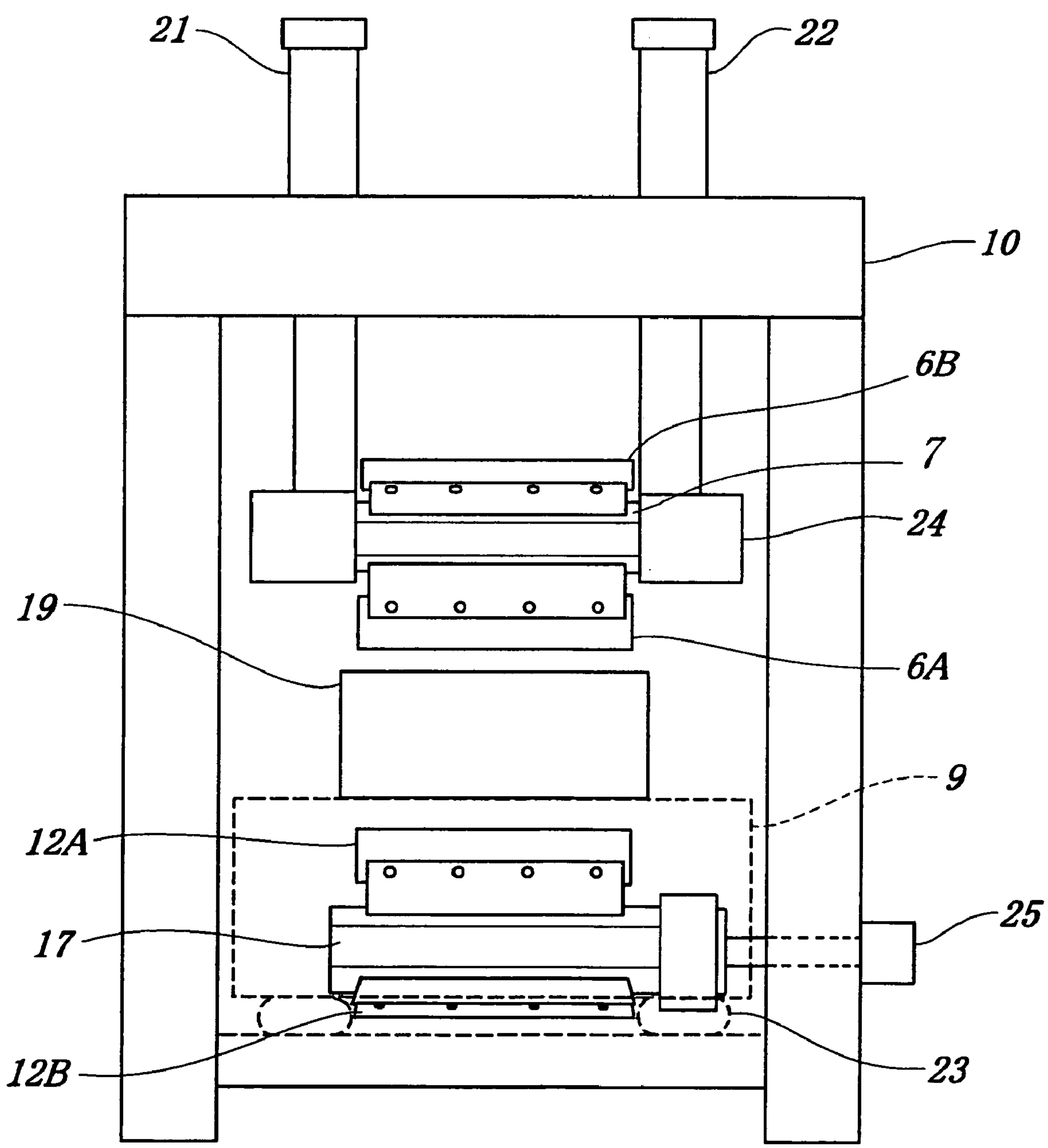
FIG. 2 is a front view showing an example of another embodiment of the present invention.

FIG. 2 shows an example of the rotary means. FIG. 2 is a front view showing an example of another embodiment of the present invention. The same parts or members as those in FIG. 1 are explained using the same numerals.

Hydraulic cylinders 21 and 22 that are installed in the upper part of the gate-like frame 10 move the rotary member 7 up and down. The three upper blades 6A, 6B and 6C are retained on the circumferential surface of the rotary member 7. In the lower part of the gate-like frame 10, there is the table 9 mounted on buffer members 23, and the table 9 is provided with the slit 11 (not shown) for protruding the lower blade 12A. The rotary member 17 is installed in the lower part of the table 9. The circumferential surface of this rotary member 17 is provided with a plurality of lower blades 12A, 12B and 12C that face the upper blades 6A, 6B and 6C. Further, the lower blade 12A needs to be retained so as to protrude from the face of the table 9 through the slit. Furthermore, the both ends of the rotary member 7 are fixed to supporting plates 24 provided on the lower end parts of the cylinders 21 and 22, and the rotary member 7 is appropriately rotated freely by a motor embedded in the lower end of the cylinder 21 and 22.

The molded block 19 to be split is conveyed onto the table 9 of the block splitter by a conveyer (not shown). The conveyed molded block 19 is positioned at rest in a central part of the table 9. The slit of the table 9 is present under the bottom face of the molded block 19 which is positioned at rest. The table 9 is mounted on the buffer members 23, and the blade edge of the upper blade 6A which is descended by the hydraulic cylinders 21 and 22 is pressed against the upper surface of the block 19. When the upper blade 6A is further descended from this state, the buffer members 23 are elastically pressed down, then the table 9 is elastically descended, and the lower blade 12A which is installed inside the slit protrudes from the face of the table 9 and pressed against the bottom face of the block 19. Then the block 19 is sandwiched between the upper blade 6A and lower blade 12A and split. After the block 19 has been split, the upper blade 6A is moved upward again by the hydraulic cylinders 21 and 22. The split molded block 19 is transferred to the next process by a discharge conveyer (not shown). Reference numeral 25 indicates a handling device. In FIG. 2, the upper blade 6C and the lower blade 12C are not shown.

Figure 3:
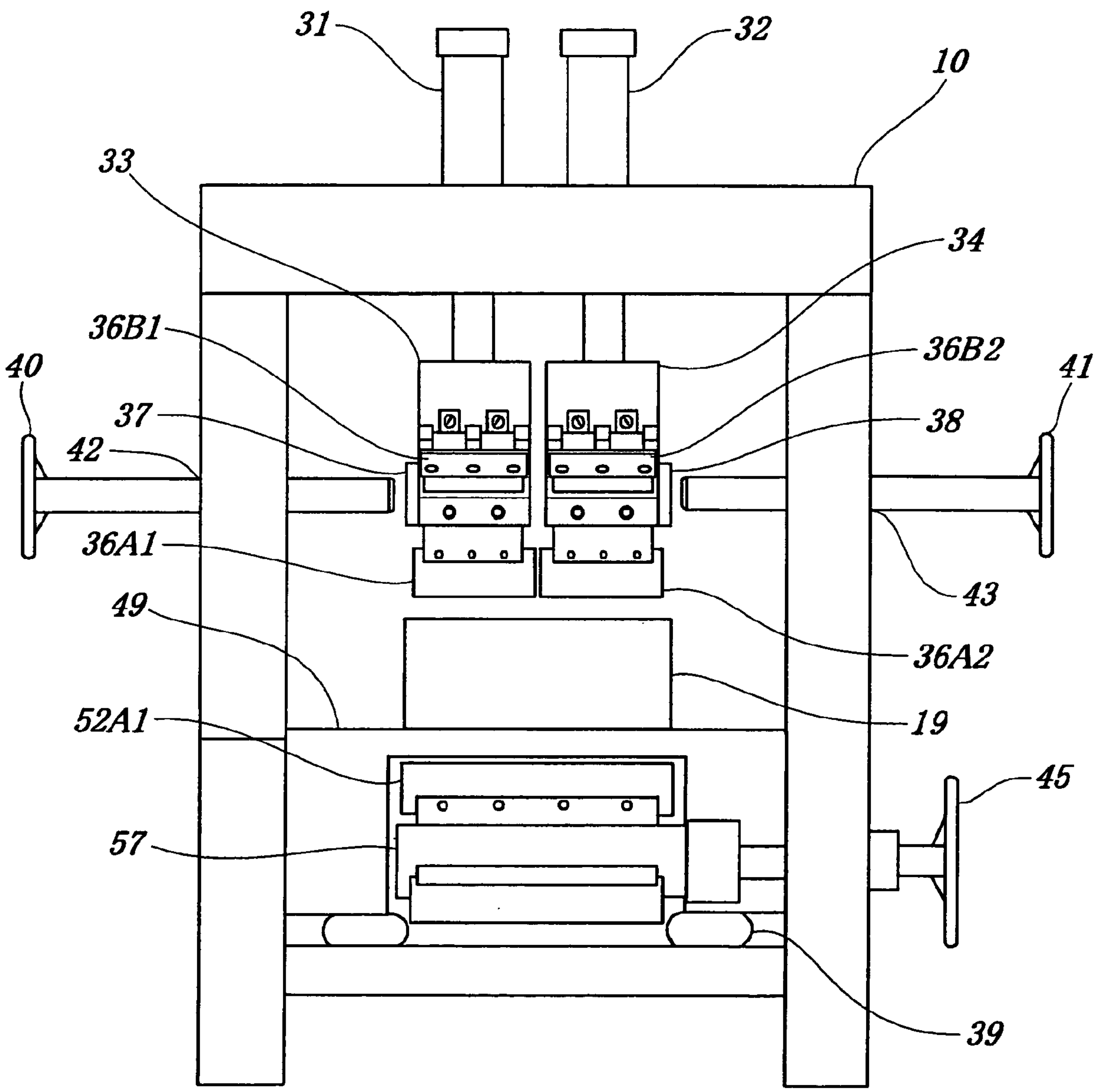
FIG. 3 is a front view showing an example of another embodiment of the present invention.

FIG. 3 is a front view showing an example of another embodiment of the present invention. The same parts or members as those in FIG. 1 are explained using the same numerals. As shown in FIG. 3, in the block splitter according to this embodiment, two upper rotary members 37 and 38, each supported upper blades thereon so as to make pairs of upper blades, are provided with convex portions at axial outer ends thereof; and two handling devices 40 and 41, which are provided with concave portions having shapes to be fitted and fixed into the above concave portions and have grasping portions on the other ends, are installed in the axial direction of rotary members 37 and 38 as thorough shafts 42 and 43 passing through the gate-like frame 10.

The two hydraulic cylinders 31 and 32 that are installed in the upper part of the gate-like frame 10 move up and down supporting plates 33 and 34 to which the rotary members 37 and 38 are bounded. Further three upper blades 36A1, 36B1 and 36C1 are held on the circumferential surface of the rotary member 37. The same applies to three upper blades 36A2, 36B2 and 36C2 that are held on the circumferential surface of the rotary member 38

Figure 4:
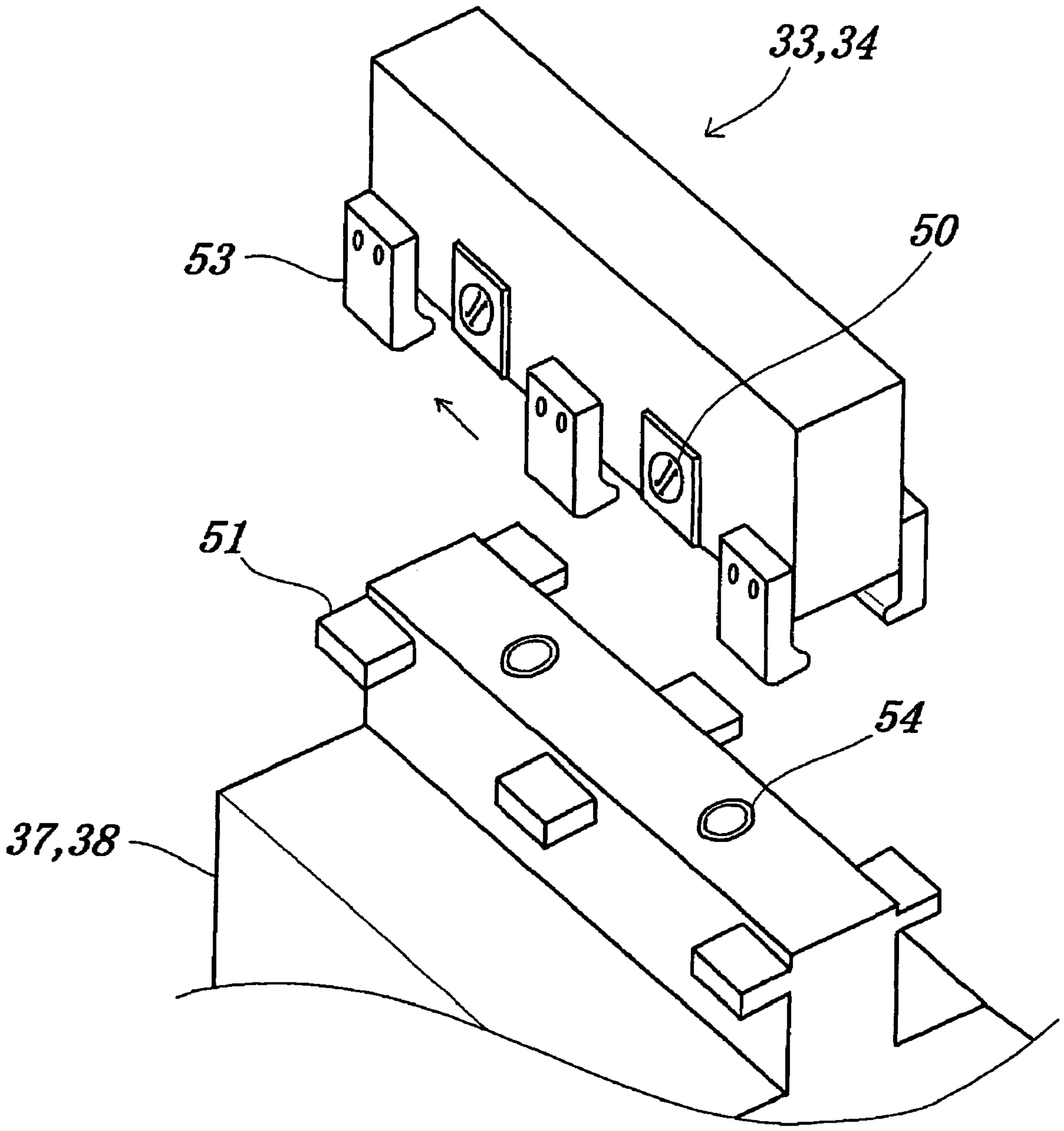
FIG. 4 is a partial perspective view for explaining a method of bounding the upper rotary members 37 and 38 to the supporting plates 33 and 34.

FIG. 4 is a partial perspective view for explaining a method of bounding the rotary members 37 and 38 to the supporting plates 33 and 34. In order to release the rotary members 37 and 38 from the supporting plates 33 and 34, the handling devices 40 and 41 which are not shown are inserted into the concave portions of the axial outer ends of the rotary members, and thereby fixedly fitted, thereafter a magnetic lock 50 is turned OFF to cancel magnetization of a fitting magnetic body 54. At this time, flanges 51 of the rotary member 37 and 38 are being mounted in a pinching fashion on suspending members 53 of the supporting plates 33 and 34. By pressing the handling devices 40 and 41 (not shown) towards the direction of the arrow in the figure, the flanges 51 of the rotary members 37 and 38 can be removed from the suspending members 53 of the supporting plates 33 and 34. At this time the rotary members 37 and 38 are being fitted and fixed to and supported by the handling devices 40 and 41. The handling devices 40 and 41 are pushed down in this state, the upper blades 36A1 and the like that are held by the rotary members 37 and 38 are rotated together with the rotary members at the place where the handling devices are pushed down, and the upper blades 36B1 (not shown) and the like are selected accordingly. After selection, the rotary members 37 and 38 are magnetically bonded to the supporting plates 33 and 34, using the above-described opposite method.

Figure 5:
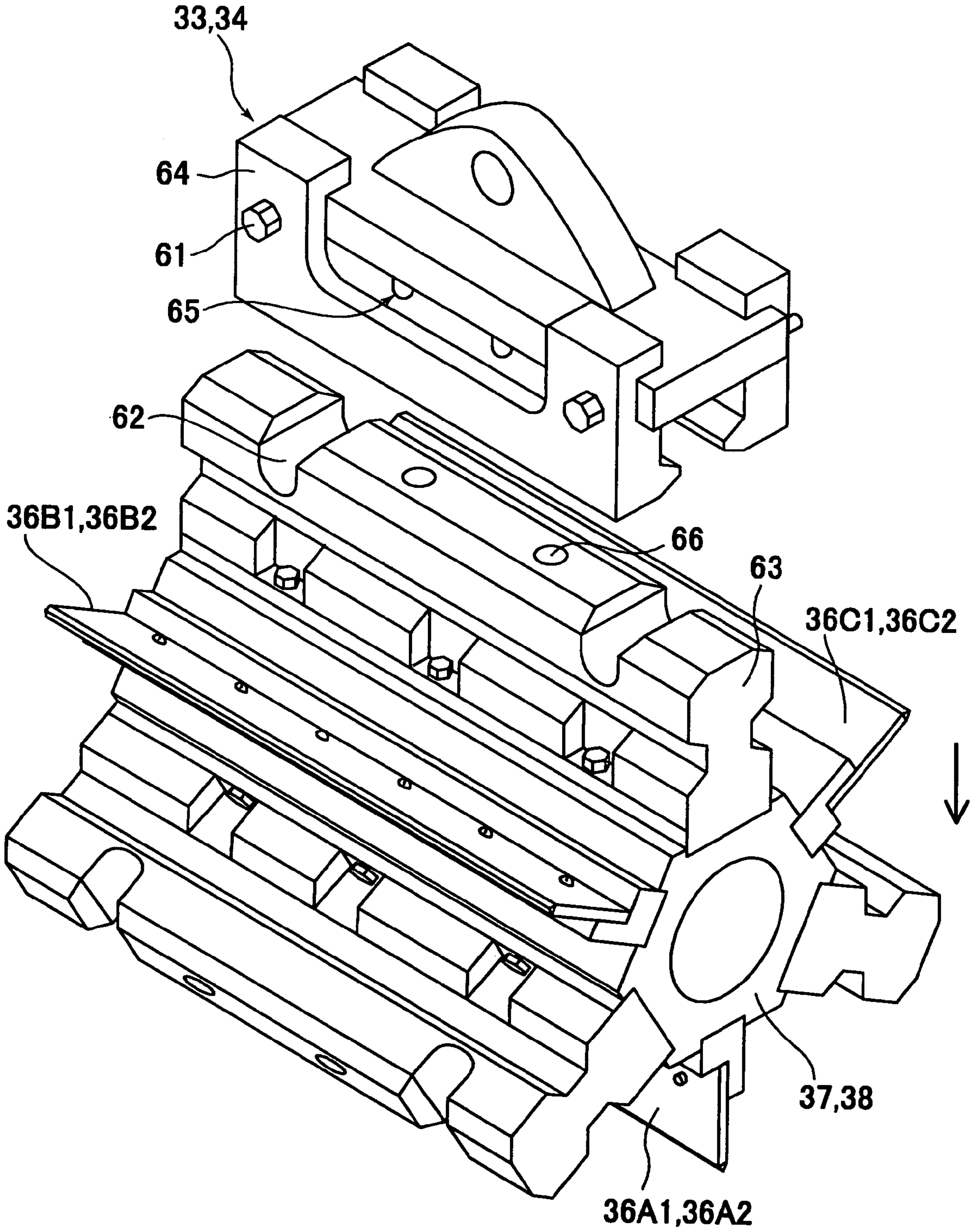
FIG. 5 is a partial perspective view for explaining another method of bounding the upper rotary members 37 and 38 to the supporting plates 33 and 34.
Figure 6:
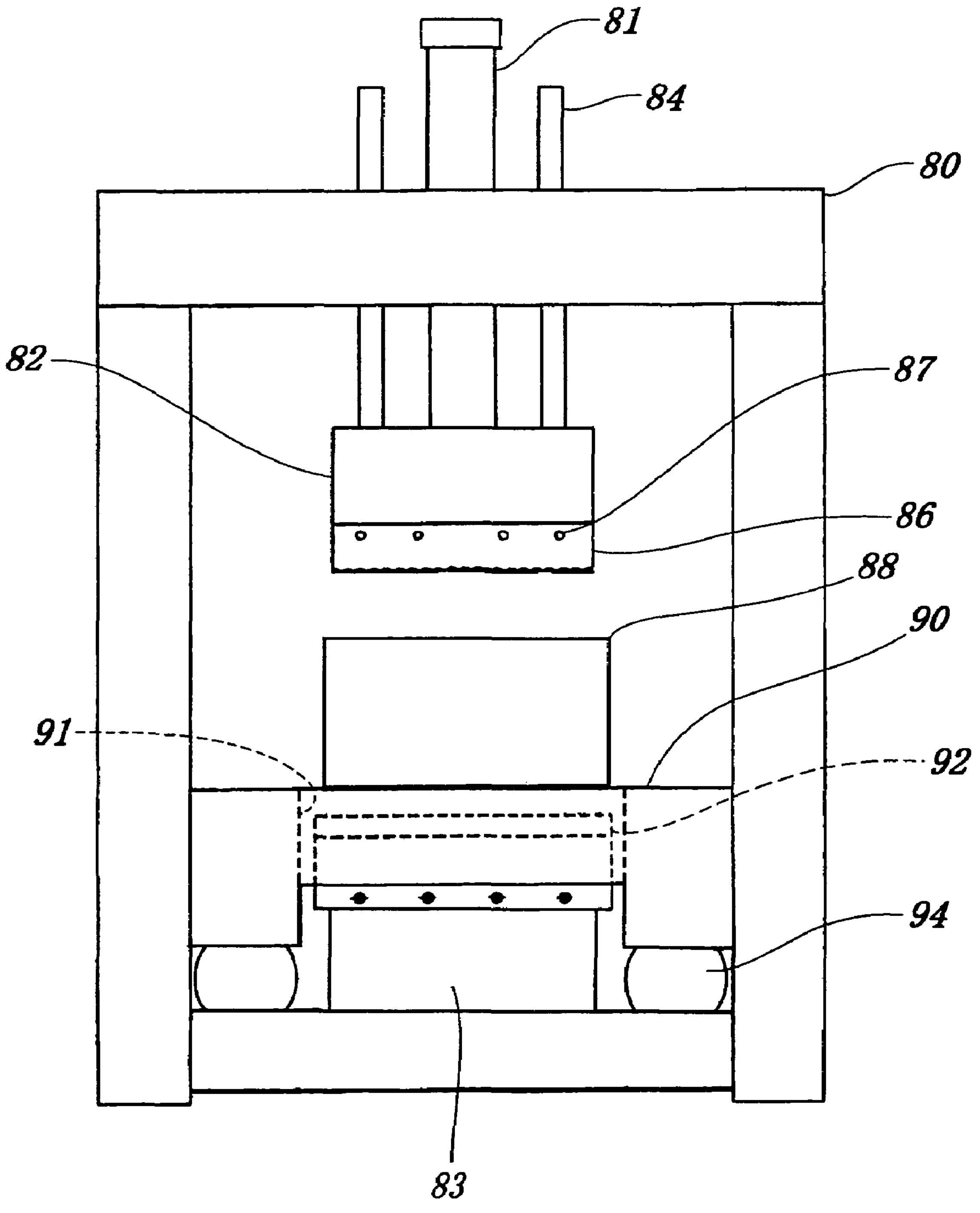
FIG. 6 PRIOR ART
FIG. 6 is a front view showing a substantial part of the block splitter which has long been used.

FIG. 5 is a partial perspective view for explaining another method of bounding the rotary members 37 and 38 to the supporting plates 33 and 34. In order to release the rotary members 37 and 38 from the supporting plates 33 and 34, the handling devices 40 and 41 which are not shown are inserted into the concave portions of the axial outer ends of the rotary members, and thereby fixedly fitted, thereafter bolts 61 are loosen and pulled out of insertion holes 62. At this time, a convex portion 63 of the rotary member 37 and 38 are being placed in a pinching fashion on suspending members 64 of the supporting plates 33 and 34, and the rotary members 37 and 38 are being fitted and fixed to and supported by the handling devices 40 and 41. The handling devices 40 and 41 are pushed down from this state towards the direction of the arrow in the figure to a predetermined position, the upper blades 36A1 and the like that are held by the rotary members 37 and 38 are rotated together with the rotary members at the place where the handling devices are pushed down, and the upper blades 36B1 and the like are selected accordingly. After selection, the rotary members 37 and 38 are jointed to the supporting plates 33 and 34, using the above-described opposite method, in which the rotary members 37 and 38 are introduced between the suspending member 64 and jointed to the supporting plates 33 and 34 by inserting the bolts 61 into the insertion holes 62. Reference numerals 65 and 66 are a fitting convex portion and a fitting concave portion for positioning the respective members in a correct positional relationship therebetween and this positioning can also be effected by means of positioning pins and insertion holes.

Moreover, as shown in FIG. 3, in the lower part of the gate-like frame 10, there is a table 49 which is supported via buffer members 39, and the table 49 is provided with a slit (not shown) for protruding a lower blade 52A1. A lower rotary member 57 is installed in the lower part of the table 49. A plurality of lower blades 52A1, 52B1, 52C1 facing the upper blades 36A1, 36A2, 36B1, and 36B2, 36C, 36C2 are held on a circumferential surface of this rotary member 57. Further, the lower blade 52A1 is supported so as to protrude from the face of the table 49 through the slit.

The molded block 19 to be split is conveyed onto the table 49 of the block splitter by a conveyer (not shown). The conveyed molded block 19 is positioned at rest in a central part of the table 49. The slit of the table 49 is present under the bottom face of the molded block 19 which is positioned at rest. The table 49 is mounted on the buffer members 39, and the blade edges of the paired upper blades 36A1 and 36A2 which are descended by the hydraulic cylinders 31 and 32 are pressed against the upper surface of the block 19. When the upper blades 36A1 and 36A2 are further descended from this state, the buffer members 39 are elastically pressed down, then the table 49 is elastically descended, and the lower blade 52A1 which is installed inside the slit protrudes from the face of the table 49 and pressed against the bottom face of the block 19. Then the block 19 is sandwiched between the upper blades 36A1 and 36A2 and the lower blade 52A1 and then split. After the block 19 has been split, the upper blades 36A1 and 36A2 are moved upward again by the hydraulic cylinders 31 and 32. The split molded block 19 is transferred to the next process by a discharge conveyer (not shown). A handling device 45 is installed for the rotary member 57. In FIG. 3, the upper blades 36C1 and 36C2 and the lower blades 52B1 and 52C1 are not shown.

In the above paragraphs, the embodiments using the lower rotary member holding three lower blades on its circumferential surface are explained, splitting of blocks could be successfully performed by installing a lower rotary member holding four blades on its circumferential surface in the above-mentioned block splitter. The number of plural upper and lower splitting blades may be varied to desired numbers by appropriately modifying the design or arrangement of the upper and lower rotary members.

What is claimed is:

1. A splitting blade changing device for a block splitter, comprising a revolving mechanism in which an upper rotary member is suspended by a supporting plate which is moved up and down by a cylinder installed in an upper part of a gate-like frame, a plurality of upper blades are held on a circumferential face of the upper rotary member, a slit is provided in a table which is supported in a lower portion of the gate-like frame via buffer members, an lower rotary member fixed detachably on a bottom plate of the gate-like frame is installed in a lower part of the table, a plurality of lower blades facing the upper blades are held on a circumferential surface of the lower rotary member such that one of the lower blades protrudes from the table surface via the slit of the table, and the upper and lower rotary members sequentially select and install the upper blades and lower blades.

2. A splitting blade changing device for a block splitter, comprising a revolving mechanism in which a pair of upper rotary members are suspended by a pair of supporting plates which are moved up and down by a pair of cylinders installed in an upper part of a gate-like frame, a plurality of upper blades are held on each of circumferential surfaces of the upper rotary members so as to make a plurality of pairs of upper blades with the upper blades held on circumferential surfaces of the other upper rotary member, a slit is provided in a table which is supported in a lower portion of the gate-like frame via buffer members, a lower rotary member fixed detachably on a bottom plate of the gate-like frame is installed in a lower part of the table, a plurality of lower blades facing the upper blades are held on a circumferential surface of the lower rotary member so as to protrude from the table surface via the slit of the table, and the upper and lower rotary members sequentially select and install the upper blades and lower blades.

3. The splitting blade changing device for a block splitter according to claim 1, wherein a concave portion is provided at both axial ends or one axial end of the upper rotary member, and two or one handling devices which have a convex portion having a shape to be fitted and fixed into the concave portion and have a grasping portion on the other ends are installed in the axial direction of the upper rotary member as through shafts passing the gate-like frame.

4. The splitting blade changing device for a block splitter according to claim 2, wherein a concave portion is provided at both axial ends or one axial end of each upper rotary member, and two or one handling devices which have a convex portion having a shape to be fitted and fixed into the concave portion and have a grasping portion on the other ends are installed in the axial direction of each upper rotary member as through shafts passing the gate-like frame.

5. The splitting blade changing device for a block splitter according to claim 1, wherein the upper rotary member and the lower rotary member are formed in a shape of a polygonal column having side faces twice as many as the number of a plurality of upper blades or lower blades that are held on the circumferential surface of each rotary member.

6. The splitting blade changing device for a block splitter according to claim 2, wherein the upper rotary member and the lower rotary member are formed in a shape of a polygonal column having side faces twice as many as the number of a plurality of upper blades or lower blades that are held on the circumferential surface of each rotary member.

* * * * *